May 9, 1933.  R. H. WHITEHEAD ET AL  1,907,919
SYNCHRONOUS CLOCK HAVING MEANS FOR STORING AND RELEASING ENERGY
Filed Jan. 18, 1930  3 Sheets-Sheet 1
Fig. 1.
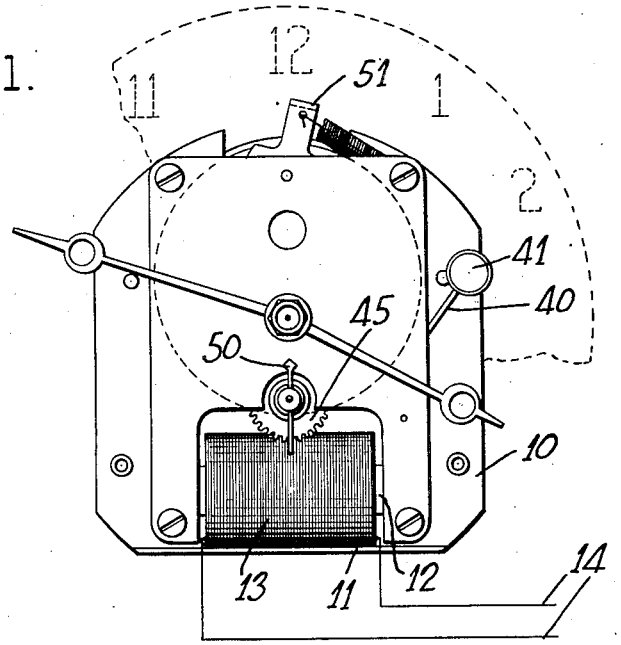
Fig. 2.
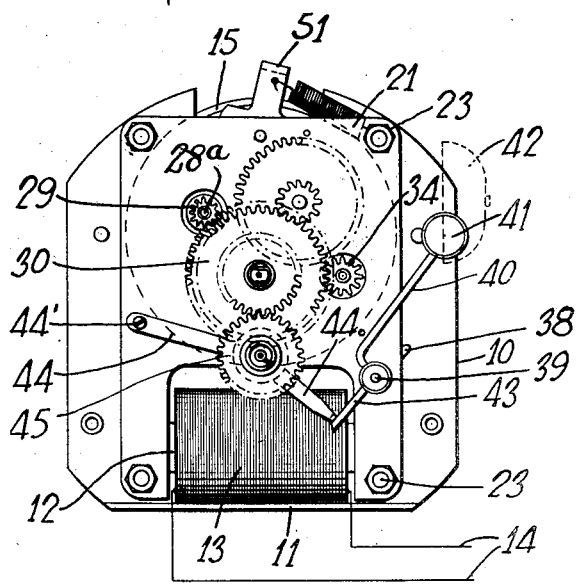
Fig. 3.
INVENTOR.
Richard N. Whitehead
Wilson E. Porter
BY
Warfield & Watson
ATTORNEYS.

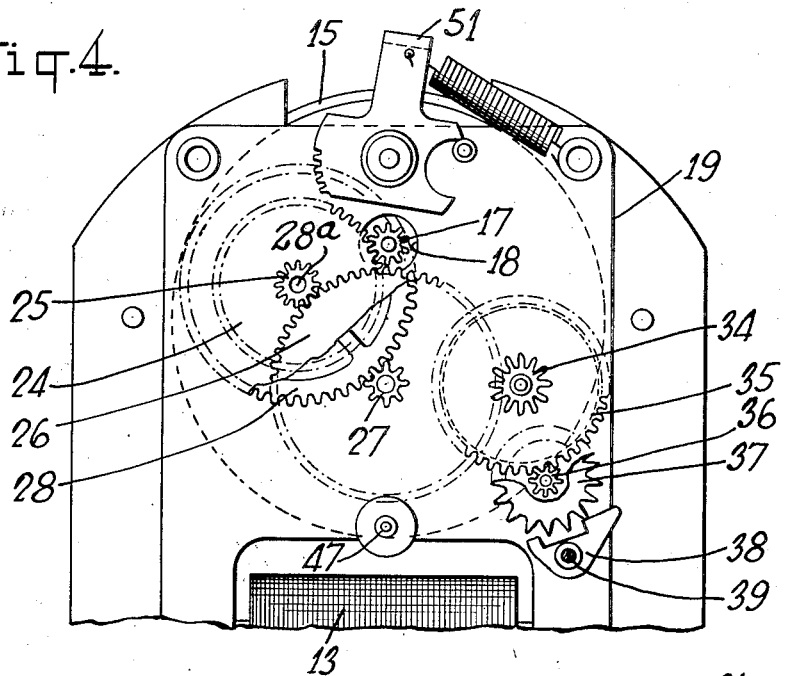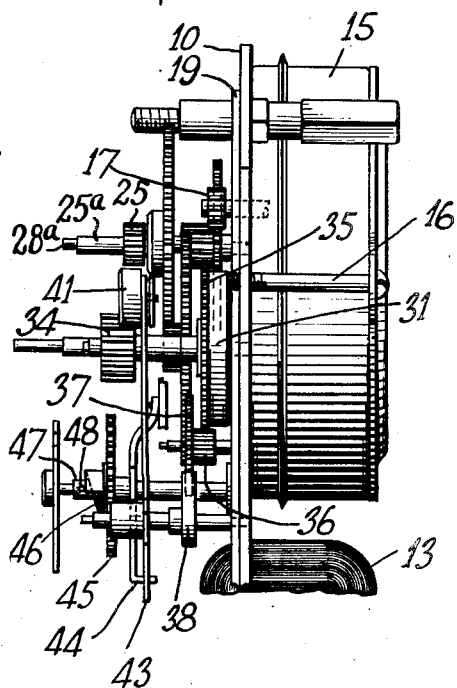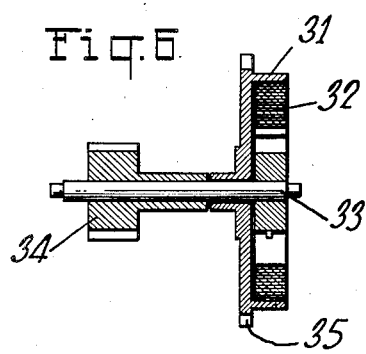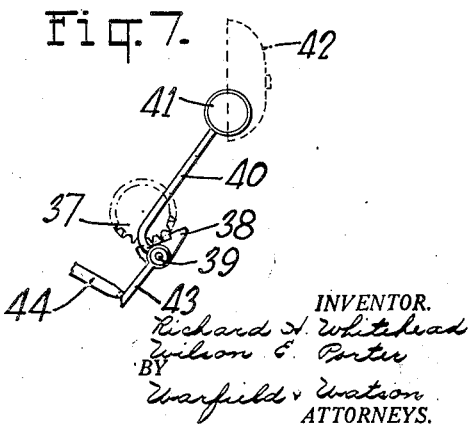

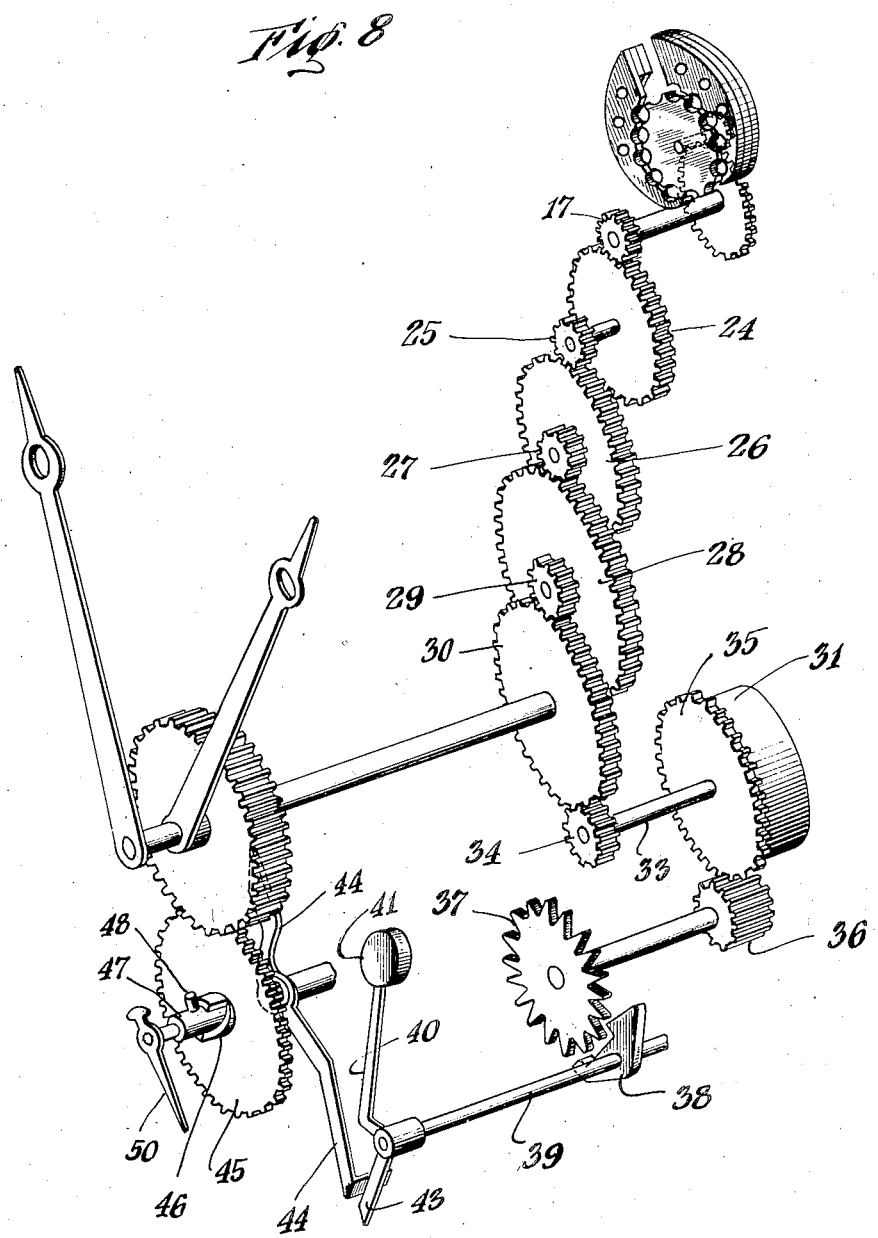

Patented May 9, 1933

1,907,919

UNITED STATES PATENT OFFICE

RICHARD H. WHITEHEAD AND WILSON E. PORTER, OF NEW HAVEN, CONNECTICUT, ASSIGNORS TO THE NEW HAVEN CLOCK CO., OF NEW HAVEN, CONNECTICUT, A CORPORATION OF CONNECTICUT

SYNCHRONOUS CLOCK HAVING MEANS FOR STORING AND RELEASING ENERGY

Application filed January 18, 1930. Serial No. 421,688.

This invention relates to synchronous clocks having means for storing and releasing energy, and particularly to synchronous clocks having means for storing relatively large amounts of energy to be released intermittently for giving alarms, signals and the like.

The invention has for its object a synchronous clock of the character described, which is efficient, economical and readily manufactured.

More specifically, an object of the invention is to provide a clock in which the timing element has a motor of the synchronous type with means for storing energy from the motor, adapted to be intermittently released without interfering with the time keeping qualities of the motor.

Another object is to provide a spring means adapted to be wound by the running of a relatively small synchronous motor without greatly increasing the load on the motor, so as to stall the motor.

Another object is to provide an electric means adapted to give timing movement arranged for storing and releasing energy at predetermined times, whereby electric clocks of the synchronous variety may be provided with a clock signal train such as alarms or like mechanisms actuated electrically without resorting to external sources of energy.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

Fig. 1 is a front elevation of a synchronous clock, constructed in accordance with the invention, a fragment of the clock dial being shown in broken lines;

Fig. 2 is a front elevation of the mechanism of the clock shown in Fig. 1 with the hands and front plate removed;

Fig. 3 is a side elevation of the clock mechanism shown in Fig. 1;

Fig. 4 is an enlarged fragmentary view of the upper portion of the clock mechanism shown in Fig. 2 with another plate of the clock-frame removed;

Fig. 5 is an enlarged side elevation of the portion of the clock mechanism shown in Fig. 4;

Fig. 6 is an enlarged sectional view of the winding means employed in the present invention;

Fig. 7 is a fragmentary elevation of an alarm-giving mechanism here employed; and Figure 8 is a diagrammatic view showing the motor in its relation to the alarm mechanism with the gears expanded into straight-line form, better to show the cooperative relationship of the parts.

Referring now to the drawings, 10 denotes generally the frame of a clock mechanism, which employs a synchronous type motor of any convenient variety, for example, that shown in my co-pending application, Serial No. 384,265, filed August 8th, 1929, and here shown as comprising a U-shaped stator member having a portion of its base bent up, so as to be substantially perpendicular to the main portion, the bent up portion being shown at 11 and serving partly as a magnetic shunt and partly as a stiffening member. Across the lower end of the legs of the U member, but above the member 11 is secured a magnetic core 12 on which is mounted an exciting winding 13; this winding having current supply conductors 14 which lead from any suitable alternating current source, for example, a commercial 110-volt, 60-cycle source. The upper ends of the legs of the U-member are bridged by a rotor housing 15 which contains the motor rotor (see Figure 8); the housing being secured to the stator member by means of columns 16. Projecting from the rotor housing is a driving pinion 17 (see Figure 3, 4 and 5) which is arranged to extend through an opening 18 formed in the rear plate 19 of the clock-frame that is arranged to carry the gear train of the clock works. This frame may also be of any convenient form, for example, that shown in which 20 and 19 are respectively the front and rear plates, there being an intermediate plate 21, all secured together by means of columns disposed at the four corners as indicated at 23. This gear train is of convenient form, and comprises a gear 24 disposed to mesh with the pinion 17 and has a pinion 25 secured in driving relation thereto through a hollow spindle 25a; the pinion 25 meshing with gear 26 that drives a pinion 27, the latter meshing with a gear 28 that has an arbor 28a passing through the spindle 25a. This arbor 28a is arranged to extend beyond the hollow sleeve, passing through the intermediate plate 21, and supports a pinion 29 adapted for driving a second-wheel 30 pivoted on the intermediate plate 21. This second-wheel is shown as having associated therewith the usual hour and minute wheels, for driving the clock-hands or time-indicators.

The second wheel 30 runs at a relatively reduced speed and is with advantage utilized to supply the power to the energy-storing means employed in accordance with the present invention. The energy-storing means is preferably a resilient element, for example, a spring device comprising a spring drum 31 which contains a spiral leaf-spring 32, as shown in Fig. 6, arranged to be wound from a centre arbor 33 with which its inner end engages. The outer end of this spring is arranged to have yielding engagement with the energy-transmitting train, so as to avoid over-winding. Such connection may have any convenient form; for example that shown in co-pending application Serial No. 396,473 filed October 1st, 1929, and here shown as an arrangement involving frictional engagement of the outer spring-end with the interior of the drum adapted for slipping when fully wound. The winding arbor 33 extends through the drum and has on its outer end a pinion 34 adapted to mesh in driving engagement with the second wheel 30. Thus, it is seen that the continuous running of the clockworks applies a slow and continuous winding effort to the spring 32 whereby energy is gradually transmitted and stored without overloading the motor; the spring slipping after a predetermined amount has been stored.

In order that the energy thus stored may be released when desired, means which are time-actuated are associated wtih the clock-train for holding and releasing driving force from the drum 31; the drum being provided with a peripheral gear 35 in order conveniently to obtain driving force therefrom. A pinion 36 is pivoted in the clock-frame in mesh with gear 35 and has a rigidly connected escapement-wheel 37 for actuating any suitable device which is adapted to utilize the energy of the spring and here shown as comprising an alarm. In order to actuate this alarm, the escapement-wheel has a cooperating escapement anchor 38 pivoted to oscillate about a pin 39 mounted in the clock-frame. This pin also has secured thereto an arm 40 of an alarm hammer 41 arranged to engage with a signal-giving device, for example, a sound giving or resonant member in bell form, as shown in broken lines at 42. The pin 39 is also preferably provided with a detent arm 43 adapted to be engaged by a releasing means actuated by the clockworks; this releasing means being here shown as comprising a laterally movable resilient bar 44; the far end of which is preferably secured to the clockframe, as indicated at 44'; (see Figures 2, 5 and 8) the middle portion being engaged by a cam-actuating element that in turn is actuated by the clock-train through a gear 45, associated with and driven by the second-wheel 30; this gear having a hollow sleeve 46 rotating and slidable upon a stud 47 carried by the clock-frame. The inner end of the sleeve 46 presses upon the middle portion of the bar 44; the upper end of the sleeve being cut away (see Figure 5) along a helix which curves upwardly from the surface of the gear 45 to a point substantially a complete circumference removed from the starting point. The sleeve thus cut away has a substantially vertical drop from the apex to the starting point, and provides what is in effect a cam-end in the form of a curved triangle adapted to engage with a projecting means or pin 48 in the stud 47. Thus, it is seen that when the gear 45 has been turned sufficiently by the clock-train to cause the apex of the cam to pass under the pin 48, a sharp axial movement of the gear 45 is effected by the energy stored in the resilient bar 44 which is thereby permitted to move so as to disengage with the detent arm 43. Thus, it is seen that at the time when the cam apex passes under the pin 48, the detent arm 43 is released, so that the escapement-anchor 38 is free to oscillate and transmit energy from the spring 32 through the escapement-wheel 37 to the hammer 41 which is thereby actuated to give an alarm. Stud 47 is preferably frictionally held in the clock-frame, so that it may be adjusted to turn the pin 48 to different positions, thereby permitting the release of the energy at any desired time. To assist in determining the times when the energy is to be released, the stud 47 is preferably extended, so as to pass through the dial of the clock and has on its dial-end a hand 50 which is movable about the dial, the latter preferably having auxiliary markings to indicate the position of the pin 48 in conjunction with the indicator hand.

In operation, it is seen that when the conductors 14 are connected to a suitable source of current, the winding 13 is energized and the clock-train runs as soon as the synchronous type motor is started. This may be effected by any convenient means, for example, by means of a starting lever, as shown in my co-pending application, Serial No. 384,265, above referred to, and here shown as a lever 51 adapted to engage temporarily with the gear 24 for driving pinion 17 to impart starting torque thereto. The running of the clockworks is seen to transmit a constant driving force to the second-wheel 30 and hence to the pinion 34 which winds the spring 32; this continuing until the spring is fully wound, thereafter the spring slips in the drum 31 until the time when the energy thus stored is to be released. The hand 50 being set to a position showing the time when the energy is to be released, causes the pin 48 to take a position with respect to the sleeve 46, whereby the gear wheel 45 is caused to shift at the desired time permitting movement of the bar 44 to release the detent arm 43, to give an alarm.

Since certain changes may be made in the above construction and different embodiments of the invention could be made without departing from the scope thereof, it is intended that all matter contained in the above description or shown in the accompanying drawings, shall be interpreted as illustrative and not in a limiting sense.

Having described our invention, what we claim as new and desire to secure by Letters Patent, is:

1. In an audible-signal synchronous electric clock, in combination, a continuously rotating synchronous electric motor; time indicating means synchronously driven by the said synchronous electric motor; a clock signal mechanism; control-means for periodically releasing the said clock signal mechanism and operatively connected to the said synchronous electric motor for being in turn controlled thereby; and a driving-train interposed between the said continuously-rotating synchronous electric motor and the said clock signal mechanism, including energy-storing means, and constructed and arranged to yield when a predetermined amount of energy has been stored by the said energy-storing means to thereby prevent the same from imposing such excess load upon the said synchronous motor as would throw the same out of step with the current supplied thereto and interfere with the same in its primary function of synchronously propelling the said time-indicating means when the said clock signal mechanism is stopped by the said control-means.

2. In a clock mechanism of the character described, in combination, a synchronous motor, a time train synchronously driven by said synchronous motor, a clock signal train, connections between said motor and said signal train to drive the latter from the former including an energy storing device for accumulating energy during the periods of rest of the signal train to furnish the energy for the operation of the signal train to permit the signal train to operate or rest while the time train is driven by said motor without altering the speed of said motor and restraining means releasable by said time train, for restraining the operation of said signal train.

3. In a clock mechanism of the character described, in combination, a synchronous motor, a time train synchronously controlled by said synchronous motor, a clock signal train, connections between said motor and said signal train to drive the latter from the former including an energy storing device for accumulating energy during the periods of rest of the signal train to furnish the energy for the operation of the signal train, to permit the signal train to operate or rest while the time train is driven by said motor without altering the speed on said motor and restraining means releasable by said time train for restraining the operation of said signal train and means for limiting the storage of energy by said energy storing device to prevent stalling the motor.

4. In a clock mechanism of the character described, in combination, a synchronous motor, a speed reducing time train synchronously driven by said synchronous motor, a clock signal train, connections between said motor and said signal train to drive the latter from the former including an energy storing device comprising a spring adapted to be wound by the motor and adapted to drive the signal train and having a slip device to prevent stalling the motor and means responsive to the time train for controlling the signal train.

In testimony whereof we affix our signatures.

RICHARD H. WHITEHEAD.
WILSON E. PORTER.